United States Patent [19]
Yang

[11] Patent Number: 6,043,911
[45] Date of Patent: Mar. 28, 2000

[54] OPTICAL SOURCE MODULE WITH TWO WAVELENGTHS AND OPTICAL PICKUP APPARATUS USING THE SAME

[75] Inventor: Keun Young Yang, Kyungki-do, Rep. of Korea

[73] Assignee: LG Electronics Inc., Seoul, Rep. of Korea

[21] Appl. No.: 09/052,944

[22] Filed: Apr. 1, 1998

[30] Foreign Application Priority Data

Apr. 4, 1997 [KR] Rep. of Korea ..................... 97-12569

[51] Int. Cl.[7] .............................. G02B 5/32; G03H 1/00; G03H 1/02; G11B 7/00
[52] U.S. Cl. ................................. 359/15; 359/1; 359/27; 369/109; 369/103
[58] Field of Search .................................. 359/7, 10, 11, 359/15, 19, 27, 566; 369/103, 109, 112

[56] References Cited

U.S. PATENT DOCUMENTS 5,025,488  6/1991  Yeh et al. ................................ 359/10
5,696,749  12/1997  Brazas et al. .......................... 369/109

*Primary Examiner*—Cassandra Spyrou
*Assistant Examiner*—Audrey Chang

[57] ABSTRACT

A light source module with two wavelengths that is adapted to generate laser beams different in wavelength. In the light source module, a hologram optical element (HOE) is used to allow a first laser beam generated at a first light source and a second laser beam generated at a second light source to progress along same path. The HOE diffracts the second laser beam to change a progressive path of the second laser beam into that of the first laser beam. The first light source generates the first laser beam having a different wavelength from the second laser beam generated at the second light source.

9 Claims, 6 Drawing Sheets

OPTICAL SOURCE MODULE WITH TWO WAVELENGTHS AND OPTICAL PICKUP APPARATUS USING THE SAME

BACKGROUND OF THE INVENTION

1. Field of the Invention

This invention relates to an optical source module for generating light beams having different in wavelength. Also, this invention is directed to an optical pickup apparatus for accessing a different type of optical recording media by employing the two-wavelength optical source module.

2. Description of the Prior Art

Recently, recording media require a capability of recording a high capacity of information in accordance with a trend toward a very large quantity of information. Further, optical recording media having a remarkable increase of occupation rate have been developed in the recording medium market to record a high capacity of information. Accordingly, a digital versatile or video disc (DVD), has appeared the recording capacity of which is about 6 to 7 times greater than that of the existing compact disc (CD) or rewritable compact disc (CD-R) of the write once read only memory (WROM) type. When compared with CD or CD-R, the DVD is not only higher in recording density, that is, the track density, but it is also shorter in a distance between the disc surface and the information recording face. For example, a distance between the disc surface and the information recording face is 0.6 mm in the DVD; while being 1.2 mm in the CD or CD-R. Further, the information recording faces of the DVD and the CD-R have a different reflection ratio depending upon a wavelength of light beam. Specifically, the reflection ratio in the information recording face of the CD-R has a maximum value in the case of a wavelength of 780 nm; while that of the DVD has a maximum value in the case of a wavelength of 650 nm. As described above, as optical discs with different structure and characteristics become commercially available, an optical pickup apparatus needs a capability of accessing all the different type optical discs, such as CD, CD-R and DVD. To this end, there has been suggested an optical pickup apparatus of two-beam system employing two light sources.

As shown in FIG. 1, the two-beam system optical pickup apparatus includes first and second light sources 10 and 12 installed separately to generate light beams of 650 nm and 780 nm, respectively, and a first beam splitter 14 for matching paths of the light beams from the light sources 10 and 12. When the DVD is accessed, the first light source 10 generates a light beam having a wavelength of 650 nm, hereinafter referred to as "first light beam B1", and supplies the first light beam B1, via a first collimator lens 16, to the first beam splitter 14. On the other hand, when the CD or CD-R is accessed, the second light source 12 generates a light beam having a wavelength of 780 nm, hereinafter referred to as "second light beam B2", and supplies the second light beam B2, via a second collimator lens 18, to the first beam splitter 14. For the purpose of allowing a progressive path of the first light beam B1 to be perpendicular to a progressive path of the second light beam B2, the first light source 10 is arranged in a certain horizontal position with respect to the first beam splitter 14, for example the right side in the drawing; while the second light source 12 is arranged in a certain vertical position respect to the first beam splitter 14, for example the top side in the drawing. Then, the first beam splitter 14 passes through the first light beam B1 as it is and reflects the second light beam B2 at a right angle, thereby matching the progressive path of the first light beam B1 with that of the second light beam B2. The first light beam B1 from the first beam splitter 14 is converged in a shape of spot onto an information recording face 11A of the DVD 11 by way of a second beam splitter 20, a right angle reflective glass 22 and an objective lens 24, sequentially. The light beam reflected by the information recording face 11A of the DVD 11 arrives at the surface of a multi-divisional photo detector 28 by way of the objective lens 24, the right angle reflective glass 22, the second beam splitter 20 and a sensor lens 26 in turn. Similarly, the second light beam B2 from the first beam splitter 14 is converged in a shape of spot onto an information recording face 13A of the CD or CD-R 13, via the second beam splitter 20, the right angle reflective glass 22 and the objective lens 24 in turn. Thereafter, the converged second light beam B2 is reflected by the information recording face 13A of the CD or CD-R 13 to progress toward the multi-divisional photo detector 28 by way of the objective lens 24, the right angle reflective glass 22, the second beam splitter 20 and the sensor lens 26 in turn. Then, the multi-divisional photo detector 28 converts a quantity of the light beam incident thereto from the sensor lens 26 into an electrical signal. This electrical signal includes an information recorded on the CD or CD-R 13, or the DVD 11.

As described above, however, since the two-beam system optical pickup apparatus makes use of two light sources to generate two light beams different in wavelength, it requires additional optical devices for matching the progressive paths of the light beams from the light sources. Due to this, the two-beam system optical pickup apparatus has disadvantages in that it has a complicated configuration as well as a large bulk. Further, a manufacturing process of the optical pickup apparatus becomes complicated due to the additional optical devices.

SUMMARY OF THE INVENTION

Accordingly, it is an object of the present invention to provide a light source module with two wavelengths that is capable of generating light beams different in wavelength.

Further object of the present invention is to provide an optical pickup apparatus that is capable of simplifying its configuration as well as minimizing its dimension.

In order to achieve these and other objects of the invention, according to one aspect of the present invention there is provided with a two-wavelength light source module including a first light source for generating a first laser beam, a second light source for generating a second laser beam having a different wavelength from the first laser beam to intersect the first laser beam at a desired angle, and light path integral means having a hologram optical element for matching a progressive path of the first laser beam with that of the second laser beam.

According to another aspect of the present invention, there is provided with an optical pickup apparatus including a light source module with two wavelength for generating at least two light beams progressing along same path, said at least two light beams being different in wavelength and in flux diameter, an objective lens for converging the laser beams from the light source module onto an optical disc, and photo detecting means for converting the laser beam reflected by the optical disc into electrical signals.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
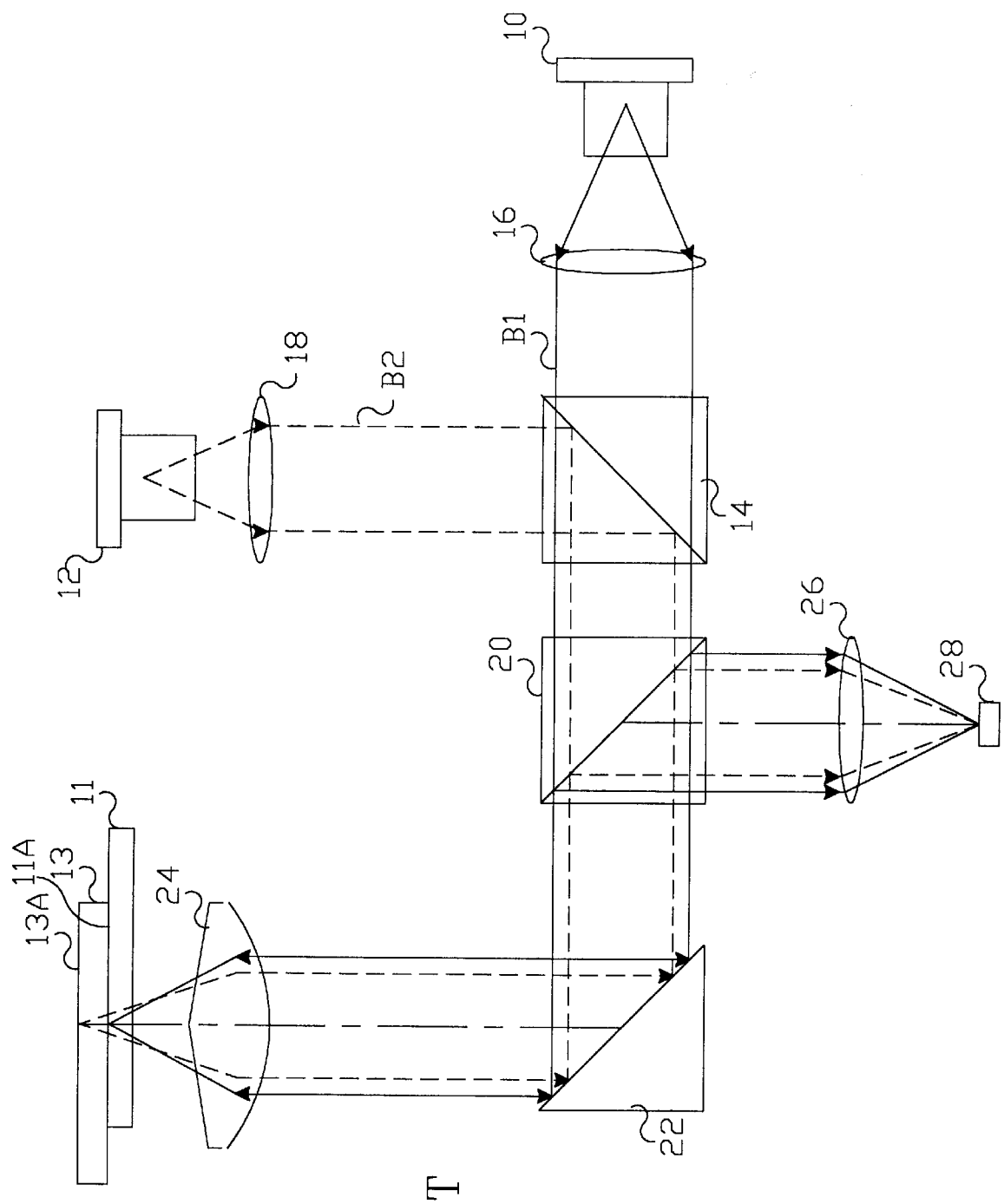
FIG. 1 is a schematic view showing a configuration of a conventional optical pickup apparatus.
Figure 2:
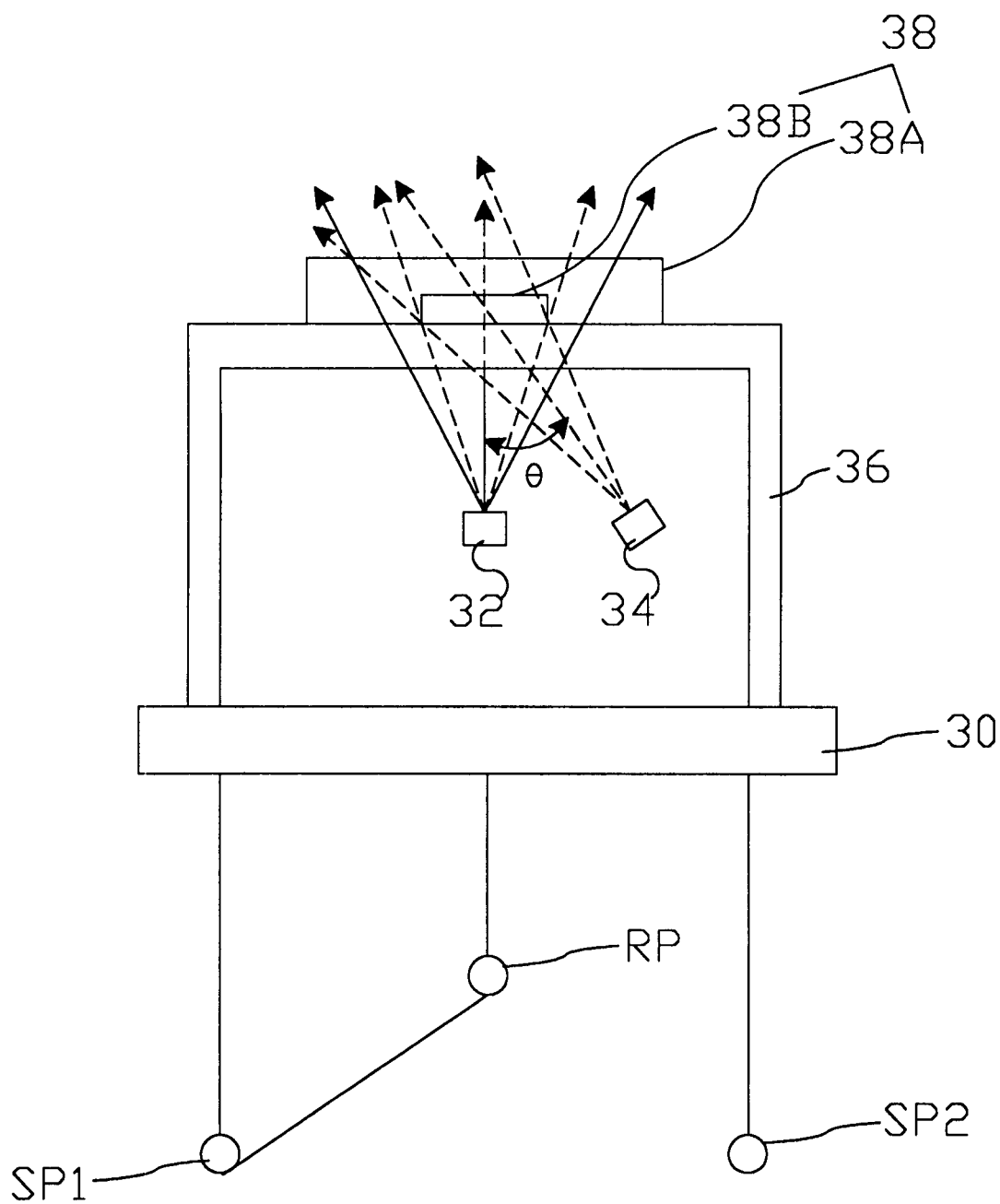
FIG. 2 is a schematic view showing a configuration of a two-wavelength optical source module according to an embodiment of the present invention.
Figure 3A:
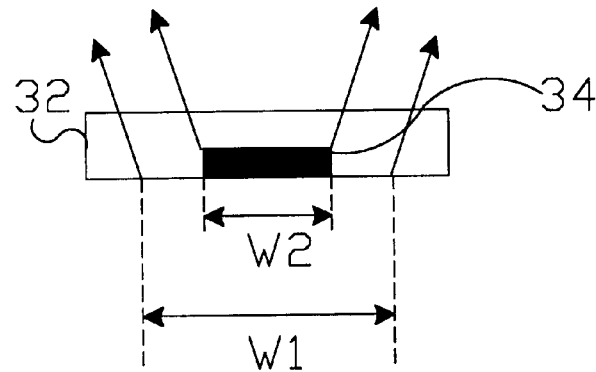
FIG. 3A is a detailed view of the hologram lens shown in FIG. 2.
Figure 3B:
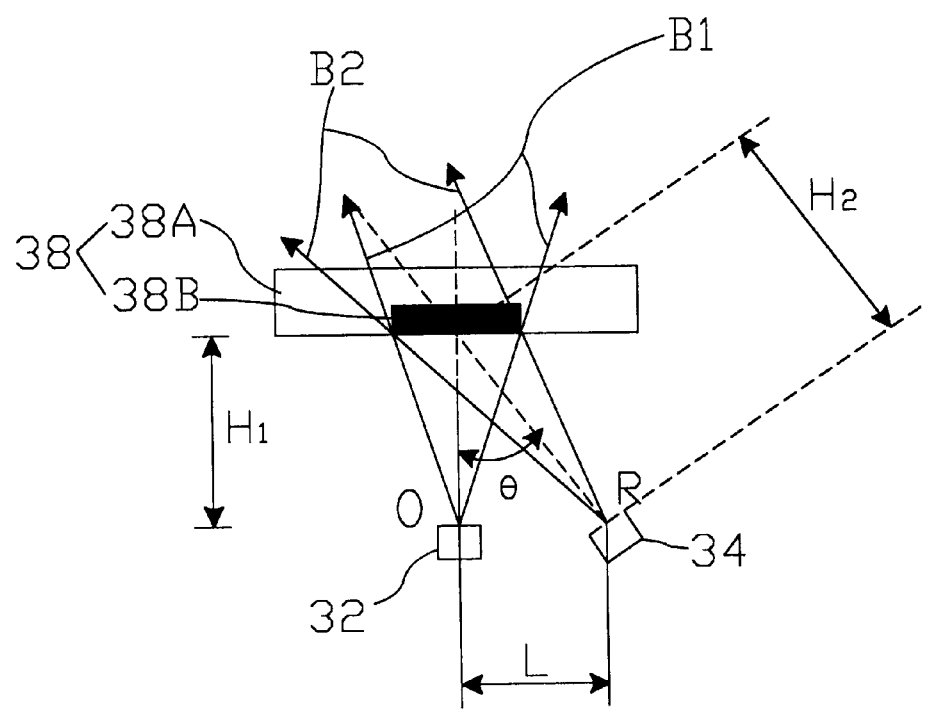
FIG. 3B is a view for explaining the relationships of first and second laser diodes to the hologram lens shown in FIG. 2.

Referring to FIG. 2, there is shown a light source module with two wavelengths according to an embodiment of the present invention. The two-wavelength light source module includes first and second laser diodes 32 and 34 installed at the upper portion of a stem 30, a cap 36 provided at the stem 30 to surround the laser diodes 32 and 34, and a hologram optical element (HOE) 38 positioned at the upper surface of the cap 36. The first laser diode 32 is installed at the center line extending from the center of the stem 30 to the center of the HOE 38. The first laser diode 32 generates a first light beam B1 having a wavelength of 650 nm adapted to access a DVD. On the other hand, the second laser diode 34 is obliquely installed at a certain position horizontal with respect to the first laser diode 32. In other words, the second laser diode 34 is installed in such a manner that a light beam obliquely progress toward the center of the HOE 38. The second laser diode 34 generates a second light beam B2 having a wavelength of 780 mm adapted to discs of CD series. The cap 38 plays a role to protect the first and second laser diodes 32 and 34 from an exterior impact and a contamination material, such as dust, particle and so on, and to support the HOE 38. The HOE 38 passes the first light beam B1 from the first laser diode 32 without change, but diffracts the second light beam B2 from the second laser diode 34, thereby matching a progressive path of the second light beam B2 with that of the first light beam B1. To this end, as shown in FIGS. 3A, 3B the HOE 38 includes a disc-type prism 38A having a first diameter W1, and a hologram 38B having a second diameter W2 that is smaller than the first diameter W1 and that is defined at the center of the bottom surface of the prism 38A. The first diameter W1 has a dimension corresponding to the aperture ratio, i.e., 0.6, of an objective lens, not shown; while the second diameter W2 has a dimension corresponding to the aperture ratio, i.e., 0.35 to 0.45, of the objective lens when a disc of CD series is accessed. With respect to such a HOE 38, the first light beam B1 emitted from the first laser diode 32 serves as an object beam and the second light beam B2 emitted from the second laser diode 34 serves a reference beam. Accordingly, the first laser diode 32 is installed at a diverging point of the object beam requested by the hologram 38B, that is, a point "O" spaced by a distance of H1 from the center of the bottom surface of the hologram pattern 38B as shown in FIG. 3B. On the other hand, the second laser diode 34 is installed at a diverging point of the reference beam requested by the hologram pattern 38B, that is, a point "R" spaced obliquely by a distance of H2 from the center of the bottom surface of the hologram 38B and spaced by a distance "L" from the "O" point. The first light beam B1 emitted from the first laser diode 32 progresses, via the hologram 38B or the surrounding disk-type prism 38A, to the objective lens. At this time, the first light beam B1 irradiated onto the hologram 38B is divided into a zero-order diffractive beam and a first-order diffractive beam. The zero-order diffractive beam progresses along the center axis of the hologram pattern 38B together with the first light beam B1 passing through the disk-type prism 38A. The second light beam B2 also is irradiated onto the entire area of the disk-type prism 38A including the hologram 38B like the first light beam B1, but only light fluxes irradiated onto the hologram 38 are diffracted to progress along the same direction as the first light beam B1. Further, a selecting switch SW having a reference contact RP, and first and second selecting contacts SP1 and SP2 is provided at the bottom surface of the stem 30. The reference contact RP of the selecting switch SW is connected to the first selecting contact SP1 or the second selecting contact SP2. When the reference contact RP of the selecting switch SW is connected to the first selecting contact SP1, the first laser diode 32 emits the first light beam B1. Otherwise, when the reference contact RP of the selecting switch SW is connected to the second selecting contact SP2, the second laser diode 34 emits the second light beam B2.

Figure 4:
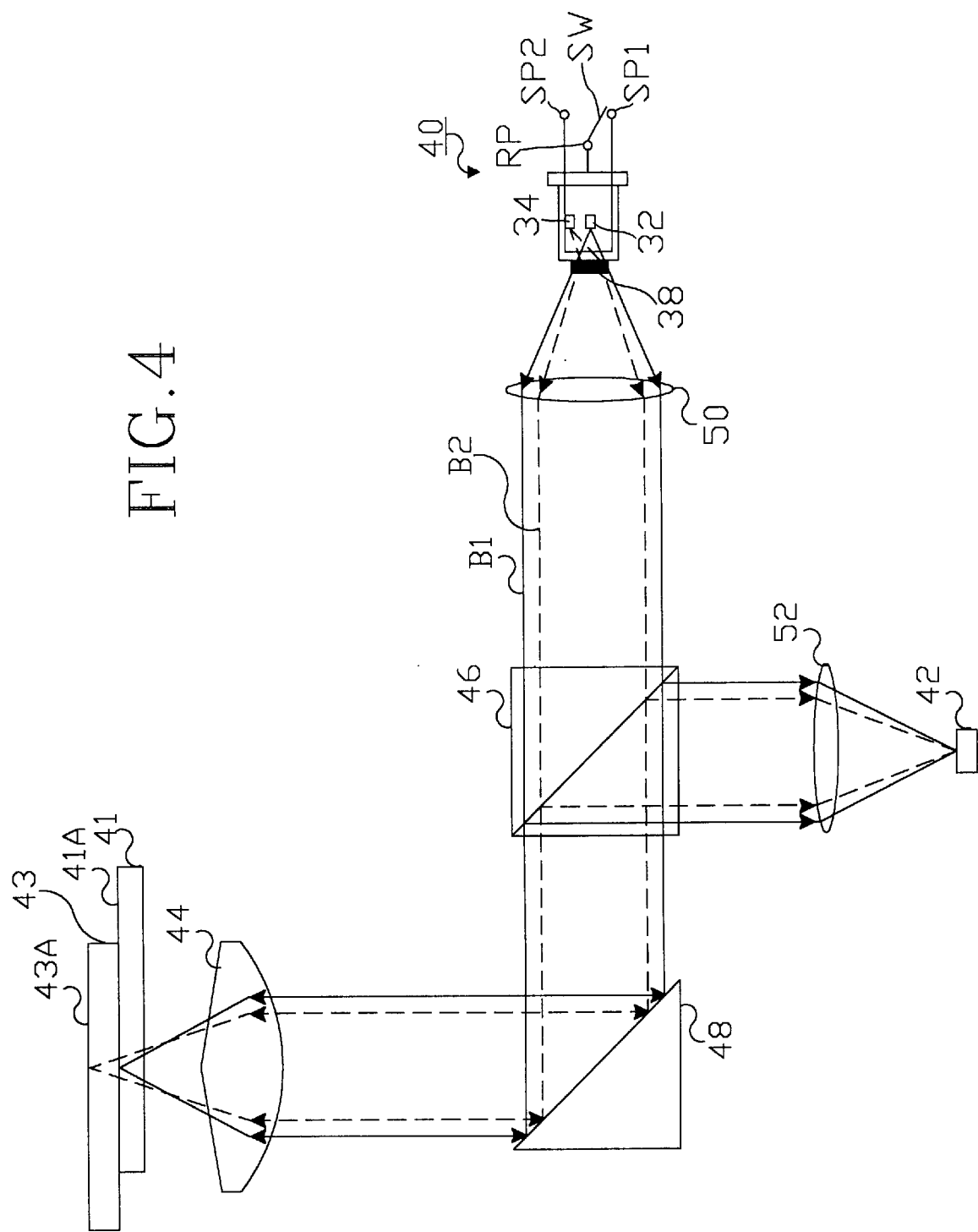
FIG. 4 is a schematic view showing an optical pickup apparatus employing a two-wavelength light source module according to an embodiment of the present invention.

Referring now to FIG. 4, there is shown an optical pickup apparatus employing a two-wavelength light source module according to an embodiment of the present invention. The optical pickup apparatus includes a two-wavelength light source module 40 for selectively generating first and second light beams B1 and B2, a multi-divisional photo detector 42 for converting a light beam reflected by a first or second optical disc 41 or 43 into an electrical signal, and an objective lens 44 for converging the light beam of the two-wavelength light source module 40 onto an information recording face 41A or 43A of the first or second optical disc 41 or 43 in the shape of a spot. The two-wavelength light source module 40 generates the first light beam B1 having a wavelength of 650 nm or the second light beam B2 having a wavelength of 780 nm depending upon a switching state of the selecting switch SW. The first light beam B1 is generated at the first laser diode 32 when the reference contact RP of the selecting switch SW is connected to the first selecting contact SP1. On the other hand, the second light beam B2 is generated at the second laser diode 34 when the reference contact RP of the selecting switch SW is connected to the second selecting contact SP2. The first optical disc 41 is a DVD being shallow in the depth extending from the surface thereof to the information recording face 41A, and the second optical disc 43 is a CD or CD-R being deep in the depth extending from the surface thereof to the information recording face 43A. The objective lens 44 converges the first light beam B1 onto the information recording face 41A of the first optical disc 41 in a shape of spot while converging the second light beam B2 onto the information recording face 43A of the first optical disc 43 in a shape of spot.

The optical pickup apparatus further includes a beam splitter 46 arranged among the two-wavelength light source module 40, the multi-divisional photo detector 42 and the objective lens 44. The beam splitter 46 passes a part, i.e., 50%, of the first or second light beam B1 or B2 from the two-wavelength light source module 40 toward the objective lens 44 and reflects the remaining part, i.e., 50%, of the first or second light beam B1 or B2 upwardly. At this time, the first or second light beam B1 or B2 progressing from the two-wavelength light source module 40 to the beam splitter 46 is converted from a shape of divergent light into a shape of parallel light by means of a collimator lens 50. Further, the beam splitter 46 reflects a part, i.e., 50%, of the reflective light beam from the first or second optical disc 41 or 43 incident thereto by way of the objective lens 44 toward the multi-divisional photo detector 42. At this time, the light beam progressing from the beam splitter 46 to the multi-divisional photo detector 42 is converged onto the surface of the multi-divisional photo detector 42 in a shape of spot by means of a sensor lens 52. The collimator lens 50 and the sensor lens prevents a leakage of light flux to enhance a light sensitivity of the optical pickup apparatus.

A right angle reflective glass 48 is arranged between the objective lens 44 and the beam splitter 46. This right angle reflective glass 48 reflects a light beam from the beam splitter 46 toward the objective lens 44 at a right angle and reflects a light beam from the objective lens 44 toward the beam splitter 46 at a right angle.

Figure 5:
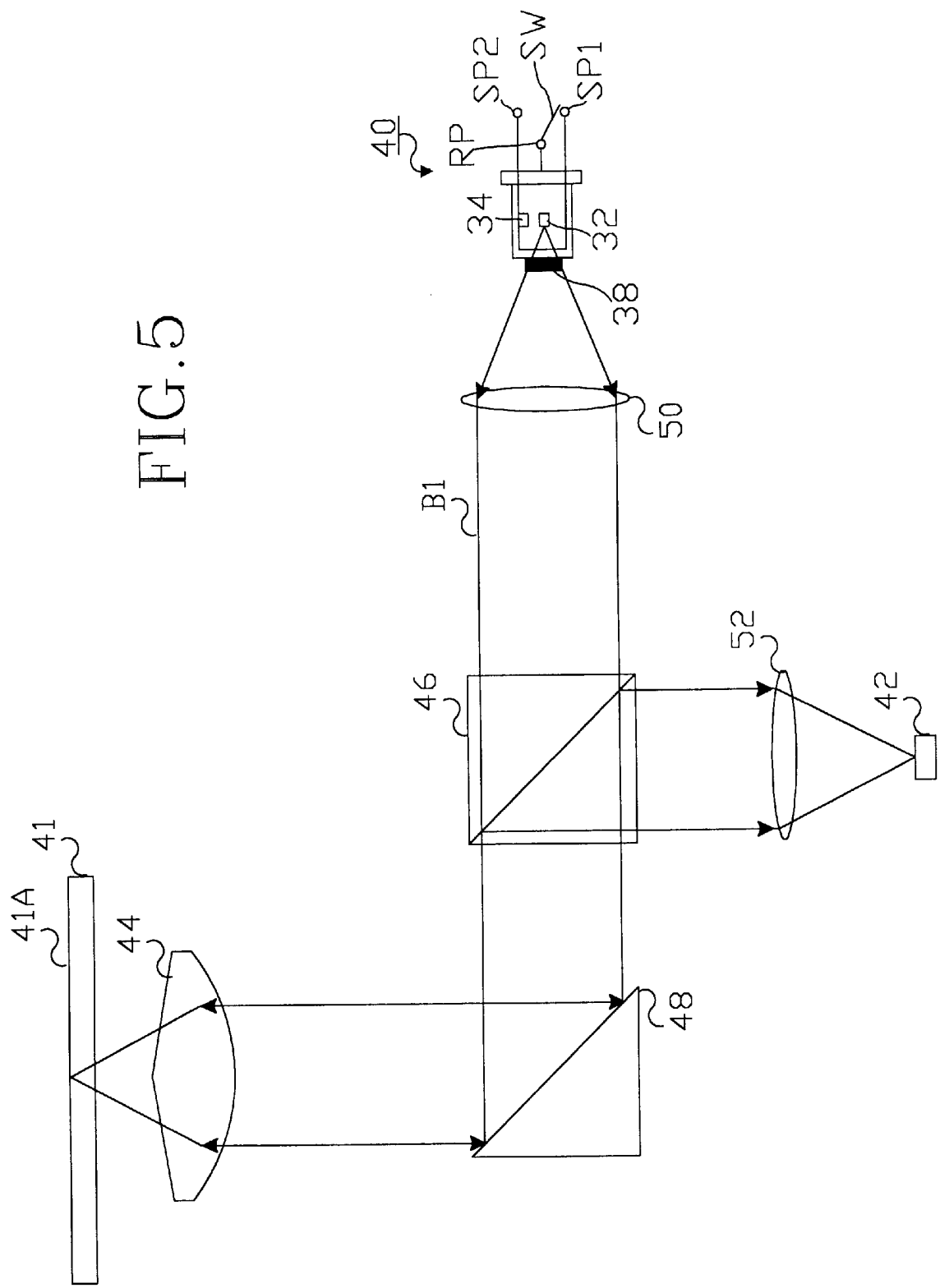
FIG. 5 is a view for explaining an operation of the optical pickup apparatus shown in FIG. 4 when a CD or CD-R is accessed.

FIG. 5 show an operational state of an optical pickup apparatus according to an embodiment of the present invention when the first optical disc 41 in FIG. 4 is accessed. With reference to FIG. 5, the reference contact RP of the selecting switch SW is connected to the first selecting contact SP1. Then, the first laser diode 32 of the two-wavelength light source module 40 generates the first light beam B1 having a wavelength of 650 nm. The first light beam B1 generated at the first laser diode 32 passes through the entire area of the disk-type prism 38A including the hologram 38B in such a manner to progress, via the beam splitter 46 and the right angle reflective glass 48, toward the objective lens 44, thereby allowing the objective lens to maintain a relatively large aperture ratio of 0.6. The first light beam B1 is irradiated onto the information recording face 41A of the first optical disc 41 in a shape of spot by means of the objective lens 44 maintaining the relatively large aperture ratio. Subsequently, the first light beam B1 reflected by the information recording face 41A of the first optical disc 41 arrives at the multi-divisional photo detector 42 by way of the objective lens 44, the right angle reflective glass 48, the beam splitter 46 and the sensor lens 52. Then, an electrical signal loaded with an information is generated at the multi-divisional photo detector 42.

Figure 6:
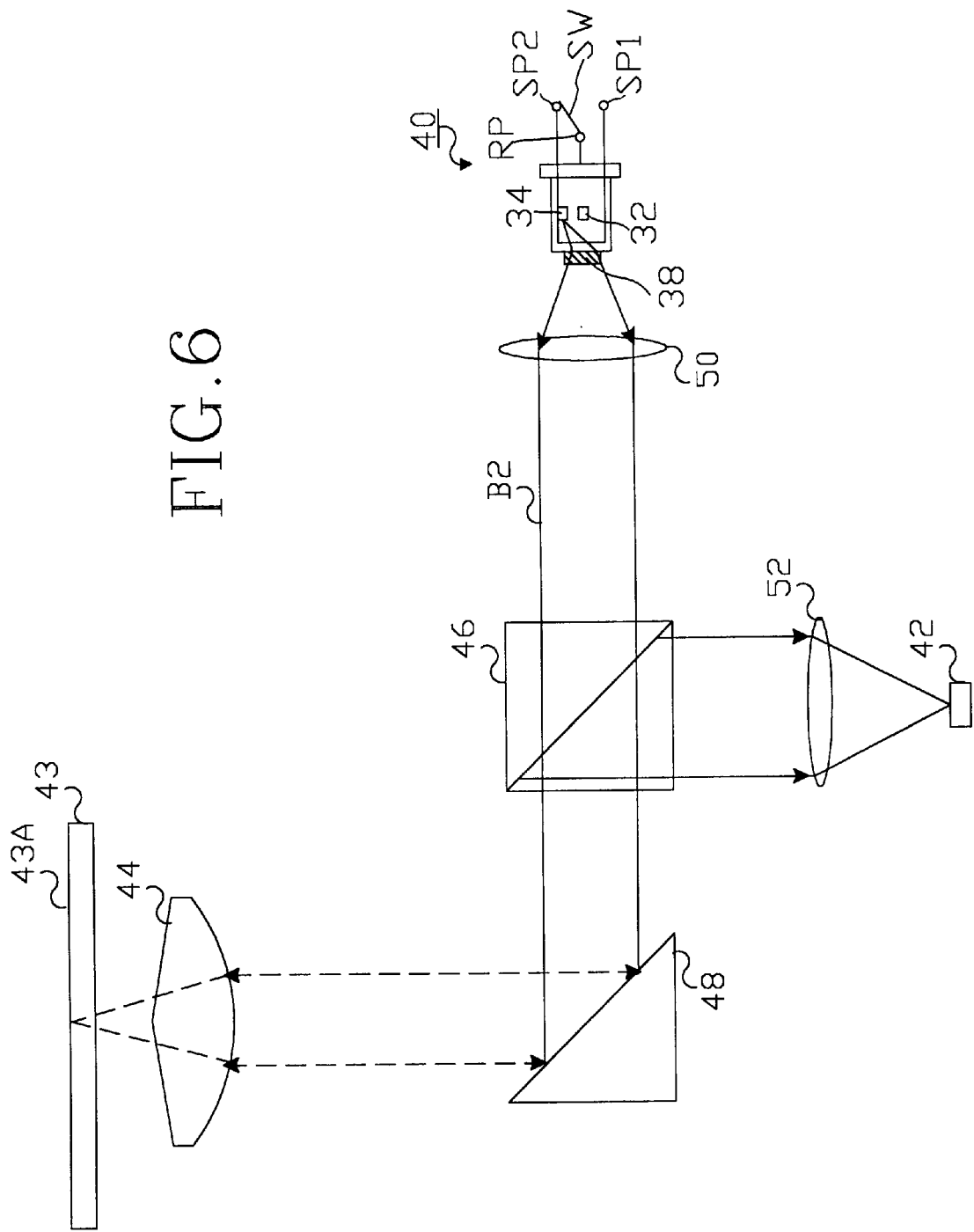
FIG. 6 is a view for explaining an operation of the optical pickup apparatus shown in FIG. 4 when a DVD is accessed.

FIG. 6 show an operational state of an optical pickup apparatus according to an embodiment of the present invention when the second optical disc 43 in FIG. 4 is accessed. With reference to FIG. 6, the reference contact RP of the selecting switch SW is connected to the second selecting contact SP2. Then, the second laser diode 34 of the two-wavelength light source module 40 generates the second light beam B2 having a wavelength of 780 nm. In this case, since only light fluxes irradiated onto the hologram pattern 38B in the second light beam B2 generated at the second laser diode 34 are incident on the objective lens 44 by way of the collimator lens 50, the beam splitter 46 and the right angle reflective glass 48, the objective lens 44 maintains a relatively small aperture ratio of 0.35 to 0.45. As a result, the second light beam B2 is irradiated onto the information recording face 43A of the second optical disc 43 in a shape of spot by means of the objective lens 44 maintaining the relatively small aperture ratio. Subsequently, the second light beam B2 reflected by the information recording face 43A of the second optical disc 41 arrives at the multi-divisional photo detector 42 by way of the objective lens 44, the right angle reflective glass 48, the beam splitter 46 and the sensor lens 52. Then, an electrical signal loaded with an information is generated at the multi-divisional photo detector 42.

As described above, in a two-wavelength light source module according to the present invention, two light beams different in wavelength generated from two laser diodes have a different flux diameter by means of the HOE including the hologram pattern. Accordingly, the two-wavelength light source module can generate two light beams different in wavelength and in flux diameter.

Further, an optical pickup apparatus employing the two-wavelength light source module selectively use a different wavelength of light beams depending upon a type of optical disc so that it can accurately access all of CD, CD-R and DVD. Also, the optical pickup apparatus omits optical devices for matching progressive paths of two light beams so that it can accomplish a simplification of configuration, a minimization of dimension and a simplification of manufacturing process.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A light source module with two wavelengths, comprising:

a first light source structured and arranged to generate a first laser beam;

a second light source structured and arranged to generate a second laser beam having a different wavelength and different optical axis from the first laser beam; and beam path integral means for making a propagating beam path direction of the second laser beam coincident with a propagating beam path direction of the first laser beam, wherein the beam path integral means includes a hologram made by a reference beam and an object beam, the first light source being located at a diverging point of the object beam of the hologram and the second light source being located at a diverging point of the reference beam of the hologram.

2. The light source module as claimed in claim 1, wherein said beam path integral means includes a holographic optical element having a prism and the hologram.

3. The light source module as claimed in claim 1, wherein said hologram of the beam path integral means makes a flux diameter of the second laser beam smaller than a flux diameter of the first laser beam.

4. The light source module as claimed in claim 1, wherein the hologram of the beam path integral means is located at an intersection of the optical axes of the first and second laser beams.

5. An optical pickup apparatus, comprising:

a light source module having a first light source structured and arranged to generate a first laser beam;

a second light source structured and arranged to generate a second laser beam having a different wavelength and different optical axis from the first laser beam; and beam path integral means for making a propagating beam path direction of the second laser beam coincident with a propagating beam path direction of the first laser beam, wherein the beam path integral means includes a hologram made by a reference beam and an object beam, the first light source being located at a diverging point of the object beam of the hologram and the second light source being located at a diverging point of the reference beam of the hologram;

an objective lens for converging the laser beams from the light source module onto an optical disc; and photo detecting means for converting the laser beam reflected by the optical disc into electrical signals.

6. The optical pickup apparatus as claimed in claim 5, further comprising:

a beam splitter for transferring the laser beams from any one of the first and second light sources of the light source module to the objective lens and for transferring the laser beam reflected by the optical disc and passed through the objective lens to the photodetecting means.

7. The optical pickup apparatus as claimed in claim 6, further comprising:

a collimator lens for allowing the light beam from any one of the first and second light sources of the light source module to progress toward the beam splitter in parallel.

8. The optical pickup apparatus as claimed in claim 7, further comprising a sensor lens for converging the laser beam progressing from the beam splitter to the photo detecting means.

9. The optical pickup apparatus as claimed in claim 6, further comprising a sensor lens for converging the laser beam progressing from the beam splitter to the photo detecting means.

\* \* \* \* \*